US010383011B2

(12) United States Patent
Berglund et al.

(10) Patent No.: US 10,383,011 B2
(45) Date of Patent: Aug. 13, 2019

(54) REDUCING LATENCY AND SAVING RESOURCES ON 'UN' INTERFACE IN CASE OF HANDOVER FROM PICO BASE STATION

(71) Applicant: Telefonaktiebolaget LM Ericsson (publ), Stockholm (SE)

(72) Inventors: Joel Berglund, Linköping (SE); Erik Eriksson, Linköping (SE); Fredrik Gunnarsson, Linköping (SE); Martin Hessler, Linköping (SE); Pontus Wallentin, Linköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/526,367

(22) PCT Filed: Dec. 12, 2014

(86) PCT No.: PCT/EP2014/077577
§ 371 (c)(1),
(2) Date: May 12, 2017

(87) PCT Pub. No.: WO2016/091325
PCT Pub. Date: Jun. 16, 2016

(65) Prior Publication Data
US 2017/0318508 A1 Nov. 2, 2017

(51) Int. Cl.
*H04W 36/02* (2009.01)
*H04W 36/00* (2009.01)
(Continued)

(52) U.S. Cl.
CPC ..... *H04W 36/0072* (2013.01); *H04W 36/023* (2013.01); *H04L 67/2842* (2013.01); *H04W 28/0257* (2013.01); *H04W 36/04* (2013.01)

(58) Field of Classification Search
CPC .................................................... H04W 36/00
See application file for complete search history.

(56) References Cited

U.S. PATENT DOCUMENTS

| | | | |
|---|---|---|---|
| 8,355,722 B1 * | 1/2013 | Tailor | H04W 28/16 370/331 |
| 8,848,593 B1 * | 9/2014 | Zhou | H04W 4/06 370/312 |
| 2014/0198655 A1 * | 7/2014 | Ishii | H04W 76/023 370/235 |

FOREIGN PATENT DOCUMENTS

EP 2306767 A1 4/2011

OTHER PUBLICATIONS

Alcatel-Lucent et al., "Solution for UE handover issue for Type-I relay", 3GPP TSG-RAN WG3 #67, Feb. 22-26, 2017, pp. 1-6, San Francisco, US, R3-100978.
(Continued)

*Primary Examiner* — Michael T Vu
(74) *Attorney, Agent, or Firm* — Coats & Bennett, PLLC (57) ABSTRACT

Small base station, micro, femto or pico BTS (PBS) are connected via Un interface to a donor eNB DeNB. In case of a handover from that PBS packets that had not been acknowledged by a UE need to be forwarded to the target base station. Forwarding them via Un and DeNB to the target eNB causes latency and wast radio resources on Un. Thus, the DeNB uses information about the handover to buffer packets and, after being informed by PBS, forward those packets that had not been acknowledged by the UE. This procedure, therefore, saves resources on Un interface and reduces latency. No forwarding of those packets from PBS to DeNB is required. There is provided a method for forwarding data to a wireless terminal. The method is performed by a proxy node. The method comprises receiving data on a link between a core network and a backhaul
(Continued)

hub node. The data is addressed to a wireless terminal served by, or handed over from, a serving network node. The method comprises receiving a first indication to forward the data to a target network node of the wireless terminal. The method comprises forwarding the data towards the target network node in response thereto. There is also provided a computer program for such a method and a proxy node configured to perform such a method.

21 Claims, 7 Drawing Sheets

(51) Int. Cl.
  *H04L 29/08* (2006.01)
  *H04W 28/02* (2009.01)
  *H04W 36/04* (2009.01)

(56) References Cited

OTHER PUBLICATIONS

Qualcomm Incorporated, "Smart Data Forwarding in X2 Handover involved with RN", 3GPP TSG-RAN WG3 Ad-Hoc, Jun. 29-Jul. 1, 2010, pp. 1-4, Beijing, China, R3-101942.
CMCC, "Discussion on Handover Optimization for Relay", 3GPP TSG-RAN WG3 AH, Jun. 29-Jul. 1, 2010, pp. 1-3, Beijing, China, R3-10xxxx.
3rd Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 12)", 3GPP TS 36.300 V12.3.0, Sep. 2014, pp. 1-215.

* cited by examiner

REDUCING LATENCY AND SAVING RESOURCES ON 'UN' INTERFACE IN CASE OF HANDOVER FROM PICO BASE STATION

TECHNICAL FIELD

Embodiments presented herein relate to forwarding of data to a wireless terminal, and particularly to a method, a proxy node, a computer program, and a computer program product for forwarding data to a wireless terminal.

BACKGROUND

In communications networks, there may be a challenge to obtain good performance and capacity for a given communications protocol, its parameters and the physical environment in which the communications network is deployed.

For example, increase in traffic within communications networks such as mobile broadband systems and an equally continuous increase in terms of the data rates requested by end-users (wireless devices) accessing services provided by the communications networks may impact how cellular communications networks are deployed. One way of addressing this increase is to deploy lower-power network nodes, such as micro or pico radio base station (RBS) network nodes (hereinafter denoted PBS), within the coverage area of a macro cell served by a macro base station (MBS) network node. Examples where such additional network nodes may be deployed are scenarios where end-users are highly clustered. Examples where end-users may be highly clustered include, but are not limited to, around a square, in a building, such as an office or a shopping mall, or along a road in a rural area. Such a deployment of additional network nodes is referred to as a heterogeneous or multi-layered network deployment, where the underlying layer of low-power micro or PBS network nodes does not need to provide full-area coverage. Rather, low-power network nodes may be deployed to increase capacity and achievable data rates where needed. Outside of the micro- or PBS-layer coverage, end-users would access the communications network by means of the overlaid macro cell.

Backhauling based on the Long Term Evolution (LTE) telecommunications standards may be carried either over normal IMT-bands, e.g. the 2.6 GHz frequency band, or by running LTE baseband communications on higher radio frequencies, such as in the 28 GHz frequency band. LTE based backhauling implies that the PBS network nodes are connected to a client node which is used to create a wireless link to a hub node.

In any of the above two cases, the wireless links are typically managed by LTE core control mechanisms. For example, the LTE Mobility Management Entity (MME) may be utilized for session control of the LTE links, and the Home Subscription Service (HSS) may be utilized for storing security and Quality of Service (QoS) characteristics of the wireless links of individual wireless end-user terminals embedded in the PBS network node.

Moreover, in practice more than one client node may connect to a common hub node. This implies support for Radio Resource Management (RRM) functions, such as scheduling and prioritization of the traffic to and from the different clients, at the hub node.

To each client node there might be several PBS network nodes, each of which may offer one or several different radio access technologies, such as based on the Universal Mobile Telecommunications System (UMTS), LTE, or IEEE 802.11x to the wireless end-user terminals of the end-users. Therefore there is a need to differentiate between the corresponding backhaul traffic to different nodes in the communications network. For example, any LTE compliant traffic may need to end up in nodes such as the serving gateway (S-GW) or the MME and any WiFi compliant traffic may end up in an edge router or an Evolved Packet Data Gateway (ePDG).

Moreover, for a given radio access technology (RAT), QoS differentiation is provided to the end-users (i.e., to the wireless end-user terminals of the end-users) so that e.g. guaranteed bitrate (GBR) services, such as voice calls, will not be disturbed by best effort (BE) services, such as web browsing. In order to enable this, QoS differentiation is needed also on the backhaul links.

If the wireless backhaul is based on LTE, there are tools that provide both the routing functions and QoS differentiation, such as based on the LTE bearer concept. Typically then, for each type of RAT, one GBR and one BE bearer are established on the backhaul links.

In general terms, using wireless backhaul links for micro/pico base stations provides simpler deployment and connection compared to wired backhaul links. For high traffic, this puts a demand on the performance of the wireless backhaul link as it may become a bottleneck. In situations where, for example, the path gain of a wireless device to another base station is better than to the base station currently serving the wireless device, the serving base station may determine to perform a handover of the wireless device to the other, target, base station. This involves performing steps, as outlined in the document 3GPP TS36.300, FIG. 10.1.2.1.1-1 for the case of X2-based handover.

However, there is still a need for an improved forwarding data to a wireless terminal.

SUMMARY

An object of embodiments herein is to provide efficient forwarding data to a wireless terminal.

The inventors of the herein disclosed embodiments have realized that during such a handover from a serving base station using wireless backhaul, the data forwarding implies that data is transmitted over the wireless backhaul and then transmitted back to the core network side to be further routed to the target base station. The inventors of the herein disclosed embodiments have realized that this involves unnecessary transmission over the wireless backhaul link which implies longer delay and valuable resources being occupied.

A particular object of embodiments herein is therefore to provide efficient forwarding data to a wireless terminal without wasting unnecessary resources.

According to a first aspect there is presented a method for forwarding data to a wireless terminal. The method is performed by a proxy node. The method comprises receiving data on a link between a core network and a backhaul hub node. The data is addressed to a wireless terminal served by, or handed over from, a serving network node. The method comprises receiving a first indication to forward the data to a target network node of the wireless terminal. The method comprises forwarding the data towards the target network node in response thereto.

Advantageously this provides efficient forwarding of data to the wireless device.

Advantageously this provides efficient forwarding data to a wireless terminal without wasting unnecessary resources.

Advantageously since both the load and delay on the backhaul link thereby may be reduced during handover, the performance of both the wireless device being handed over as well as of other wireless devices may thereby be improved.

According to a second aspect there is presented a proxy node for forwarding data to a wireless terminal. The proxy node comprises a processing unit. The processing unit is configured to cause the proxy node to receive data on a link between a core network and a backhaul hub node. The data is addressed to a wireless terminal served by, or handed over from, a serving network node. The processing unit is configured to cause the proxy node to receive a first indication to forward the data to a target network node of the wireless terminal. The processing unit is configured to cause the proxy node to forward the data towards the target network node in response thereto.

According to a third aspect there is presented a computer program for forwarding data to a wireless terminal, the computer program comprising computer program code which, when run on a processing unit of a proxy node, causes the proxy node to perform a method according to the first aspect.

According to a fourth aspect there is presented a computer program product comprising a computer program according to the third aspect and a computer readable means on which the computer program is stored.

It is to be noted that any feature of the first, second, third and fourth aspects may be applied to any other aspect, wherever appropriate. Likewise, any advantage of the first aspect may equally apply to the second, third, and/or fourth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1A:
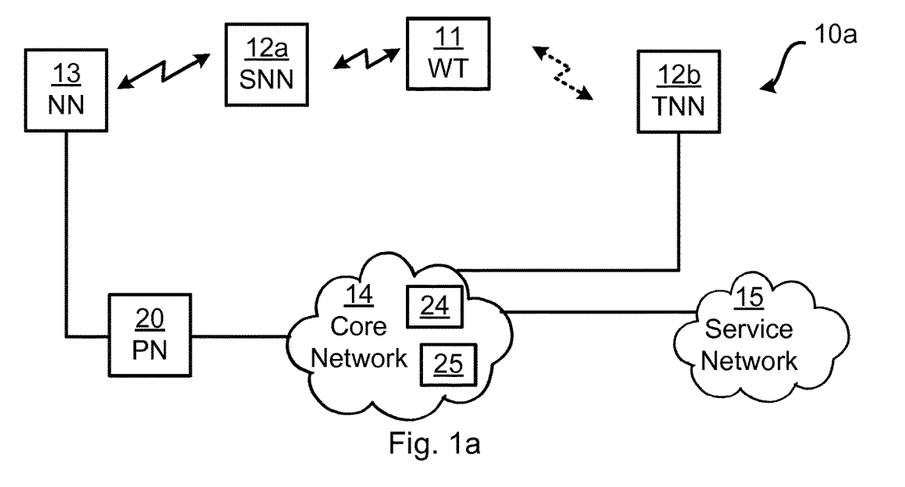
FIGS. 1a, 1b, and 1c are schematic diagram illustrating communication networks according to embodiments.
Figure 1B:
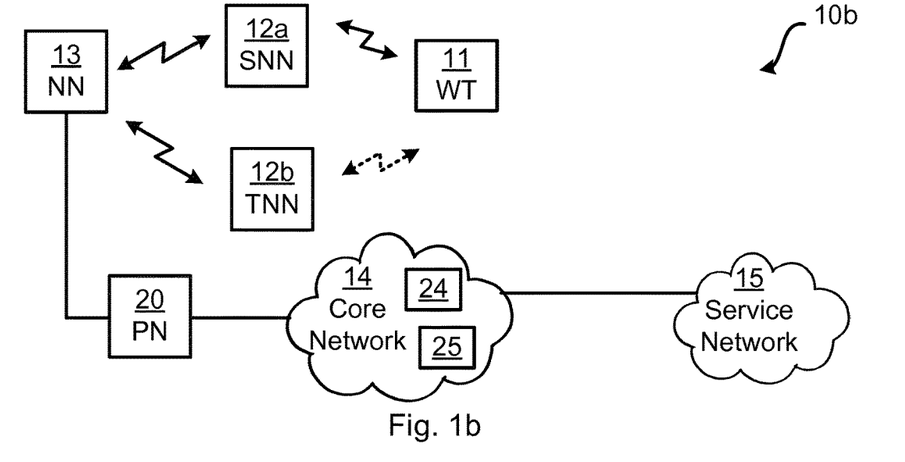
Figure 1C:
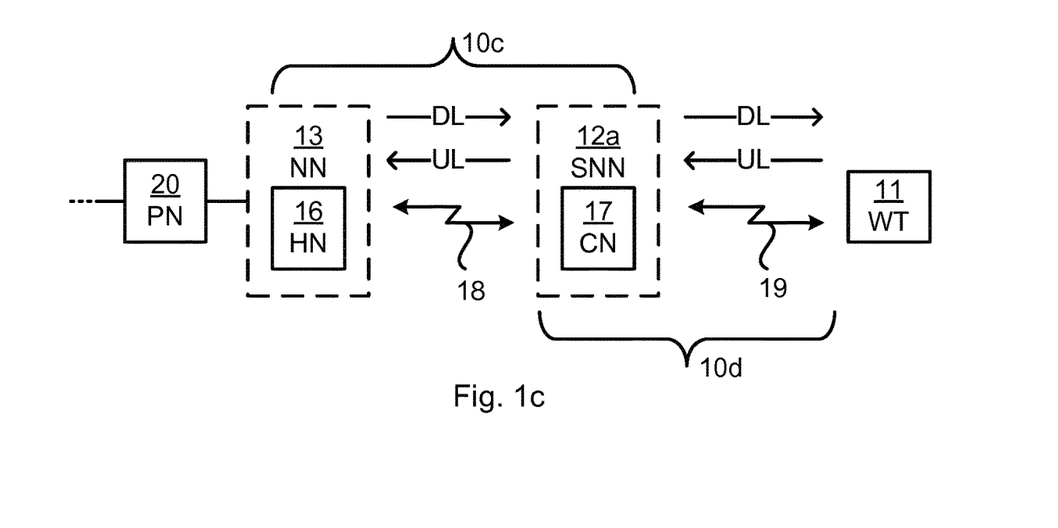

FIGS. 1a and 1b are schematic diagrams illustrating communications networks 10a, 10b where embodiments presented herein can be applied. The communications networks 10a, 10b comprises a macro radio base station (MBS) in the form of a network node 13 providing wireless backhaul to a pico radio base station (PBS) in the form of a serving network node (SNN) 12a. In the communications network 10b the network node 13 further provides wireless backhaul to a further PBS in the form of a target network node 12b (TNN) 12b, whereas in the communications network boa the target network node 12b is not provided backhaul by the network node 13 and may be either an MBS or a PBS.

The network node 13 (and optionally the network node 12b of FIG. 1a) is operatively connected to a core network 14 which in turn is operatively connected to a service providing network 15. The core network 14 comprises logical entities and devices whose functions are known to the skilled person. The core network 14 particularly comprises a Mobility Management Entity (MME) 24 and a Serving Gateway (S-GW) 25 whose functions are known to the skilled person. The service providing network 15 may be Internet Protocol based. A wireless end-user terminal (WT) 11 served by a network node 12a, 12b, 13 is thereby able to access services and data provided by the service providing network 15. The wireless end-user terminal 11 is for illustrative purposes assumed to be in an operating state and have a wireless connection to serving network node 12a. The serving network node 12a and its wireless link towards the served wireless end-user terminal 11 define an end-user access network 10c (see, FIG. 1c).

The network nodes 12a, 12b may provide one or a combination of several radio access technologies over its radio access links, e.g. 3GPP LTE, 3GPP HSPA (high speed packet access), 3GPP GSM (global system for mobile communications) or IEEE 802.11x (WiFi). Additionally, the network nodes 12a, 12b may be configured to have one or more wired interfaces towards the wireless end-user terminals 11. Each network node 12a, 12b in FIG. 1b (and at least network node 12a in FIG. 1a) needs to backhaul the end-user access network traffic and uses a wireless link towards a macro radio base station in the form of the network node 13 for this purpose.

The communications networks 10a, 10b further comprises a proxy node 20. The proxy node 20 is operatively connected between the network node 13 and the core network 14. The functionality of the proxy node 20 will be further disclosed below with reference to the herein disclosed embodiments.

The network nodes 12a, 12b in FIG. 1b (and at least network node 12a in FIG. 1a) may be backhauled by means of "client nodes" (CN) and "hub nodes" (HN). In general terms, the client node and the hub node are logical entities. The client node establishes a backhaul connection to the core network 14 via the hub node. In case of a wireless backhaul, the term "client node" thus denotes the unit (or subunit within a micro or pico radio base station) that connects the micro or pico radio base station 12a, 12b to the hub node. The hub node denotes the other end (with respect to the client node) of the wireless backhaul link where the wireless backhaul continues over a wired or wireless connection to the core network.

FIG. 1c is a schematic diagram illustrating a communications network where embodiments presented herein can be applied. The communications network of FIG. 1c comprises a macro radio base station (MBS) in the form of a network node 13 and a pico radio base station (PBS) in the form of a serving network node 12a. FIG. 1c further schematically illustrates a wireless backhaul network 10c and an end-user access network 10d. In the end-user access network 10d a wireless end-user terminal (WT) 11 is served by the serving network node 12a over a wireless link 19. In the wireless backhaul network 10c the network node 13 provides wireless backhaul over a wireless link 18 to the serving network node 12a. As illustrated in FIG. 1c, a hub node 16 may be co-located with the network node 13, and a client node 17 may be co-located with the serving network node 12a. Hence, the hub node 16 may be implemented in a macro radio base station, and the client node 17 may be implemented in a micro radio base station or a pico radio base station. However, the pico radio base station and client node 17 do not have to be co-located. The same applies for the hub node 16 and the macro radio base station.

Since the micro radio base stations or pico radio base stations have smaller coverage regions than macro base stations, handovers of wireless terminals 11 between micro radio base stations or pico radio base stations or between a micro radio base station or pico radio base station and a macro radio base station will be frequent, or at least more frequent compared to a cell with larger coverage. Dual connectivity, where the wireless terminal 11 is connected simultaneously to a macro radio base station and a micro radio base station or a pico radio base station is one way to reduce the risk of dropping the connection when the wireless terminal 11 is moved out of the coverage region of the micro radio base station or pico radio base station. However, handovers will still occur. Assuming that the communications networks 10a, 10b, 10c are based on LTE radio access technology, 3GPP has 3o specified a procedure for inter-network node handover of a wireless terminal 11 as an X2-based intra-MME/intra S-GW handover. This handover procedure will, for the completeness of the present disclosure be presented next, with reference to Section 10.1.2.1.1 in the document 3GPP TS 36.300. Reference is now made to the signalling diagram of FIG. 6.

Figure 6:
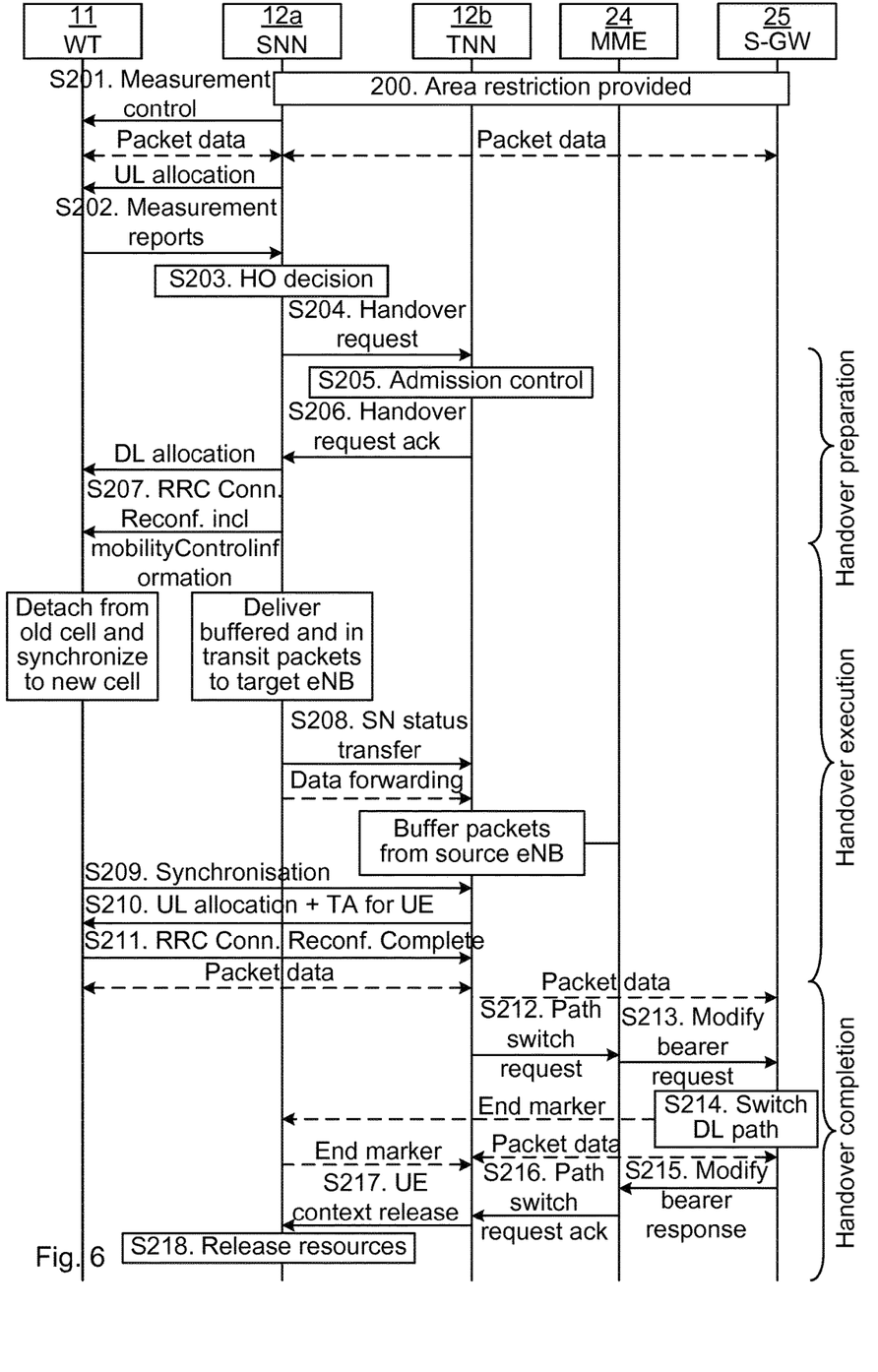
FIG. 6 is a signalling diagram according to state of the art.

S200: The wireless terminal (user equipment; UE) context within the serving network node 12a (source evolved node B; eNB) contains information regarding roaming and access restrictions which were provided either at connection establishment or at the last TA update.

S201: The serving network node 12a configures the wireless terminal measurement procedures according to roaming and access restriction information. Measurements provided by the serving network node 12a may assist the function controlling the connection mobility of the wireless terminal 11.

S202: At least one measurement report is triggered in the wireless terminal 11 and sent to the serving network node 12a.

S203: The serving network node 12a makes a decision based on the measurement report and radio resource management (RRM) information to hand off the wireless terminal 11.

S204: The serving network node 12a issues a handover request message to the target network node 12b, passing necessary information to prepare the handover at the target side (UE X2 signalling context reference at the serving network node 12a, UE S1 evolved packet core (EPC) signalling context reference, target cell ID, eNB key (KeNB*), RRC context including the Cell Radio Network Temporary Identifier (C-RNTI) of the wireless terminal 11 in the serving network node 12a, AS-configuration, Evolved Universal Terrestrial Radio Access Network (E-UTRAN) Radio Access Bearer (E-RAB) context and physical layer ID of the source cell plus short Message Authentication Code-Integrity (MAC-I) for possible radio link failure (RLF) recovery). UE X2/UE S1 signalling references enable the target network node 12b to address the serving network node 12a and the EPC network. The E-RAB context includes necessary Radio Network Layer (RNL) and Transport Network Layer (TNL) addressing information, and quality of service (QoS) profiles of the E-RABs.

S205: Admission Control may be performed by the target network node 12b dependent on the received E-RAB QoS information to increase the likelihood of a successful handover, if the resources can be granted by target network node 12b. The target network node 12b configures the required resources according to the received E-RAB QoS information and reserves a C-RNTI and optionally a radio access channel (RACH) preamble. The AS-configuration to be used in the target cell can either be specified independently (i.e. a so-called "establishment") or as a difference (delta value) compared to the AS-configuration used in the source cell (i.e. a so-called "reconfiguration").

S206 The target network node 12b prepares handover with L1/L2 and sends a handover request acknowledge to the serving network node 12a. The handover request acknowledge message includes a transparent container to be sent to the wireless terminal 11 as a radio resource control (RRC) message to perform the handover. The container includes a new C-RNTI, target network node 12b security algorithm identifiers for the selected security algorithms, may include a dedicated RACH preamble, and possibly some other parameters i.e. access parameters, SIBs, etc. The handover request acknowledge message may also include RNL/TNL information for the forwarding tunnels, if necessary. As soon as the serving network node 12a receives the handover request acknowledge, or as soon as the transmission of the handover command is initiated in the downlink, data forwarding may be initiated.

Steps S207 to S216 provide means to avoid data loss during handover and are further detailed in Sections 10.1.2.1.2 and 10.1.2.3 of 3GPP TS 36.300.

S207: The target network node 12b generates the RRC message to perform the handover, i.e., a RRC Connection Reconfiguration message including Mobility Control Information, to be sent by the serving network node 12a towards the wireless terminal 11. The serving network node 12a performs the necessary integrity protection and ciphering of the message. The wireless terminal 11 receives the RRC Connection Reconfiguration message with necessary parameters (i.e. new C-RNTI, target network node 12b security algorithm identifiers, and optionally dedicated RACH preamble, target network node system information blocks (SIBs), etc.) and is commanded by the serving network node 12a to perform the handover. The wireless terminal 11 does not need to delay the handover execution for delivering the HARQ/ARQ (Hybrid automatic repeat request/Automatic repeat request) responses to serving network node 12a.

S208: The serving network node 12a sends an SN status transfer message to the target network node 12b to convey the uplink Packet Data Convergence Protocol (PDCP) sequence number (SN) receiver status and the downlink PDCP SN transmitter status of E-RABs for which PDCP status preservation applies (i.e. for Radio Link Control Acknowledge Mode (RLC AM)). The uplink PDCP SN receiver status includes at least the PDCP SN of the first missing uplink SDU and may include a bit map of the receive status of the out of sequence uplink SDUs that the wireless terminal 11 needs to retransmit in the target cell, if there are any such SDUs. The downlink PDCP SN transmitter status indicates the next PDCP SN that the target network node 12b shall assign to new SDUs, not having a PDCP SN yet. The serving network node 12a may omit sending this message if none of the E-RABs of the wireless terminal 11 shall be treated with PDCP status preservation.

S209: After receiving the RRC Connection Reconfiguration message including the Mobility Control Information, the wireless terminal 11 performs synchronization to the target network node 12b and accesses the target cell via RACH, following a contention-free procedure if a dedicated RACH preamble was indicated in the Mobility Control Information, or following a contention-based procedure if no dedicated preamble was indicated. The wireless terminal 11 derives target network node 12b specific keys and configures the selected security algorithms to be used in the target cell.

S210: The target network node 12b responds with UL allocation and timing advance.

S211: When the wireless terminal 11 has successfully accessed the target cell, the wireless terminal 11 sends a RRC Connection Reconfiguration Complete message (C-RNTI) to confirm the handover, along with an uplink Buffer Status Report, whenever possible, to the target network node 12b to indicate that the handover procedure is completed for the wireless terminal 11. The target network node 12b verifies the C-RNTI sent in the RRC Connection Reconfiguration Complete message. The target network node 12b can now begin sending data to the wireless terminal 11.

S212: The target network node 12b sends a path switch request message to the MME 24 to inform that the wireless terminal 11 has changed cell (network node).

S213: The MME 24 sends a modify bearer request message to the S-GW 25.

S214: The S-GW 25 switches the downlink data path to the target side. The S-GW 25 sends one or more "end marker" packets on the old path to the serving network node 12a and then can release any U-plane/TNL resources towards the serving network node 12a.

S215: The S-GW 25 sends a modify bearer response message to the MME 24.

S216: The MME 24 confirms the path switch request message with the path switch request acknowledge message.

S217: By sending the UE context release message, the target network node 12b informs success of the handover to the serving network node 12a and triggers the release of resources by the serving network node 12a. The target network node 12b sends this message after the path switch request acknowledge message is received from the MME 24.

S218: Upon reception of the UE context release message, the serving network node 12a can release radio and C-plane related resources associated to the wireless terminal context. Any ongoing data forwarding may continue.

The user plane data packets are associated to a tunnel between sending and receiving end points. In the state of the art, the receiving endpoint is prepared to receive packets associated to a particular wireless terminal 11 over a General Packet Radio Service Tunneling Protocol (GTP) tunnel.

The following definitions are now made:

Common Tunnel Endpoint Identifier (C-TEID): Unambiguously identifies a tunnel endpoint in the receiving GTP-U protocol entity for a given UDP/IP endpoint. The sending end side of a GTP tunnel locally assigns the C-TEID value used in the Tunnel Endpoint Identifier (TEID) field and signals it to the destination Tunnel Endpoint using a control plane message.

GTP: The General Packet Radio Service (GPRS) Tunneling Protocol.

GTP-U Message: GTP-U (user plane) messages are either user plane messages or signaling messages. User plane messages are used to carry user data packets between GTP-U entities. Signaling messages are sent between network nodes for path management and tunnel management.

GTP-U Tunnel: A GTP-U tunnel is identified in each node with a TEID, an IP address and a UDP port number. A GTP-U tunnel is necessary to enable forwarding packets between GTP-U entities.

UDP/IP Path: A connection-less unidirectional or bidirectional path defined by two end-points. An IP address and a UDP port number define an endpoint. A UDP/IP path carries GTP messages between network nodes related to one or more GTP tunnels.

GTP-PDU: A GTP Protocol Data Unit (PDU) is a GTP-U message, which may be either a G-PDU or a signaling message.

G-PDU: User data packet (T-PDU) plus GTP-U header, sent between GTP network nodes.

Signalling Message: A GTP-U message (GTP-PDU that is not a G-PDU) sent between GTP network nodes. These may be Path Management messages or Tunnel Management messages.

T-PDU: A user data packet, for example an IP datagram, sent between a wireless terminal 11 and a network entity in an external packet data network. A T-PDU is the payload that is tunneled in the GTP-U tunnel.

Tunnel Endpoint Identifier (TEID): The TEID unambiguously identifies a tunnel endpoint in the receiving GTP-U protocol entity for a given UDP/IP endpoint. The receiving end side of a GTP tunnel locally assigns the TEID value the transmitting side has to use. The TEID values are exchanged between tunnel endpoints using control plane message.

Reference is again made to FIGS. 1a, 1b, and 1c. According to state of the art, when the wireless terminal 11 is handed over to the target network node 12b from the serving network node 12a, some data will be buffered at the serving network node 12a and then be handed over to the target network node 12b. On top of this, newly arriving data will still be destined for the serving network node 12a until the data path has been changed. This means that before the path has been changed in the MME 24, the data from the S-GW 25 will be destined for the serving network node 12a even if the wireless terminal 11 has already connected to the target network node 12b. Even if the total data through the X2 is small compared to all the data which flows through the S1 interface, the amount of data during the handover bursts can still be of significant order such that resource usage can have an impact.

Three items which may affect the delay and resource usage of the wireless terminal 11 in such scenarios are the following.

(1) Firstly, any data already buffered at the serving network node 12a when the wireless terminal 11 is handed over.

(2) Secondly, any newly arriving data from the S-GW 25 to the serving network node 12a (which shall be forwarded to the target network node 12b).

(3) Thirdly, resource usage from having to transport the data of instances (1) and (2) from the hub node 16 to the serving network node 12a and from the serving network node 12a back to the hub 12b.

The embodiments disclosed herein relate to forwarding data to a wireless terminal 11. At least some of the embodiments disclosed herein address items (1), (2), (3) disclosed above. In order to obtain such forwarding data to a wireless terminal 11 there is provided a proxy node 20, a method performed by the proxy node 20, a computer program comprising code, for example in the form of a computer program product, that when run on a processing unit, causes the proxy node 20 to perform the method.

Figure 2A:
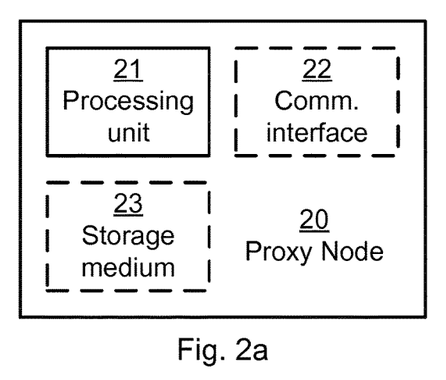
FIG. 2a is a schematic diagram showing functional units of a proxy node according to an embodiment.

FIG. 2a schematically illustrates, in terms of a number of functional units, the components of a proxy node 20 according to an embodiment. A processing unit 21 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 31 (as in FIG. 3), e.g. in the form of a storage medium 23. Thus the processing unit 21 is thereby arranged to execute methods as herein disclosed. The storage medium 23 may also comprise persistent storage, which, for example, can be any single one or combination of magnetic memory, optical memory, solid state memory or even remotely mounted memory. The proxy node 20 may further comprise a communications interface 22 for communications with at least one network node 13 and entities of the core network 14. As such the communications interface 22 may comprise one or more transmitters and receivers, comprising analogue and digital components and a suitable number of antennas for wireless communications and/or ports for wireline communications. The processing unit 21 controls the general operation of the proxy node 20 e.g. by sending data and control signals to the communications interface 22 and the storage medium 23, by receiving data and reports from the communications interface 22, and by retrieving data and instructions from the storage medium 23. Other components, as well as the related functionality, of the proxy node 20 are omitted in order not to obscure the concepts presented herein.

Figure 2B:
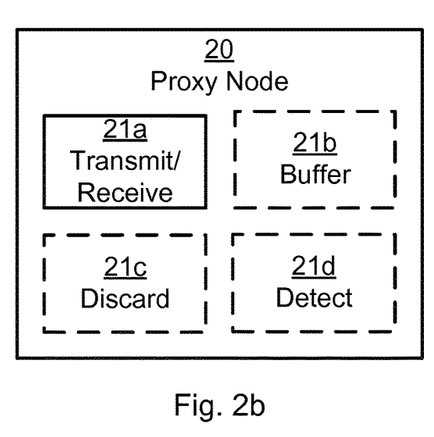
FIG. 2b is a schematic diagram showing functional modules of a proxy node according to an embodiment.

FIG. 2b schematically illustrates, in terms of a number of functional modules, the components of a proxy node 20 according to an embodiment. The proxy node 20 of FIG. 2b comprises a number of functional modules; a transmit and/or receive module 21a configured to perform below steps S102, S104a, S108, S110, S112, S112a, S114, S116. The proxy node 20 of FIG. 2b may further comprises a number of optional functional modules, such as any of a buffer module 21b configured to perform below step S106a, a discard module 21c configured to perform below step S106b, and detect module 21d configured to perform below step S104b. The functionality of each functional module 21a-d will be further disclosed below in the context of which the functional modules 21a-d may be used. In general terms, each functional module 21a-d may be implemented in hardware or in software. Preferably, one or more or all functional modules 21a-d may be implemented by the processing unit 21, possibly in cooperation with functional units 22 and/or 23. The processing unit 21 may thus be arranged to from the storage medium 23 fetch instructions as provided by a functional module 21a-d and to execute these instructions, thereby performing any steps as will be disclosed hereinafter.

The proxy node 20 may be provided as a standalone device or as a part of a further device. For example, the proxy node 20 may be provided in, or co-located with, a backhaul hub node 16 or a network node in the core network 14. The proxy node 20 may be provided as an integral part of the backhaul hub node 16 or network node in the core network 14. That is, the components of the proxy node 20 may be integrated with other components of the backhaul hub node 16 or network node in the core network 14; some components of the proxy node 20 and the backhaul hub node 16 or network node in the core network 14 may be shared. For example, if the backhaul hub node 16 or network node in the core network 14 as such comprises a processing unit, this processing unit may be arranged to perform the actions of the processing unit 21 of with the proxy node 20. Alternatively the proxy node 20 may be provided as a separate unit in the backhaul hub node 16 or network node in the core network 14.

Figure 3:
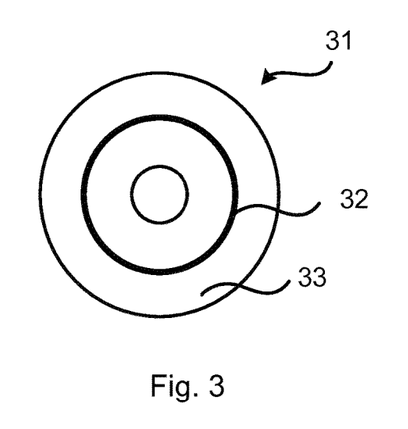
FIG. 3 shows one example of a computer program product comprising computer readable means according to an embodiment.

FIG. 3 shows one example of a computer program product 31 comprising computer readable means 33. On this computer readable means 33, a computer program 32 can be stored, which computer program 32 can cause the processing unit 21 and thereto operatively coupled entities and devices, such as the communications interface 22 and the storage medium 23, to execute methods according to embodiments described herein. The computer program 32 and/or computer program product 31 may thus provide means for performing any steps as herein disclosed.

In the example of FIG. 3, the computer program product 31 is illustrated as an optical disc, such as a CD (compact disc) or a DVD (digital versatile disc) or a Blu-Ray disc. The computer program product 31 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 32 is here schematically shown as a track on the depicted optical disk, the computer program 32 can be stored in any way which is suitable for the computer program product 31.

Figure 4:
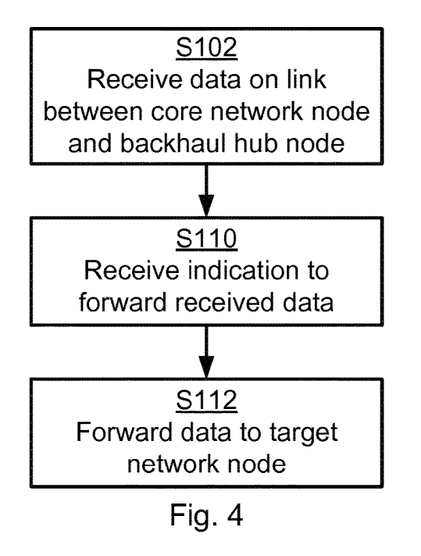
FIGS. 4 and 5 are flowcharts of methods according to embodiments.
Figure 5:
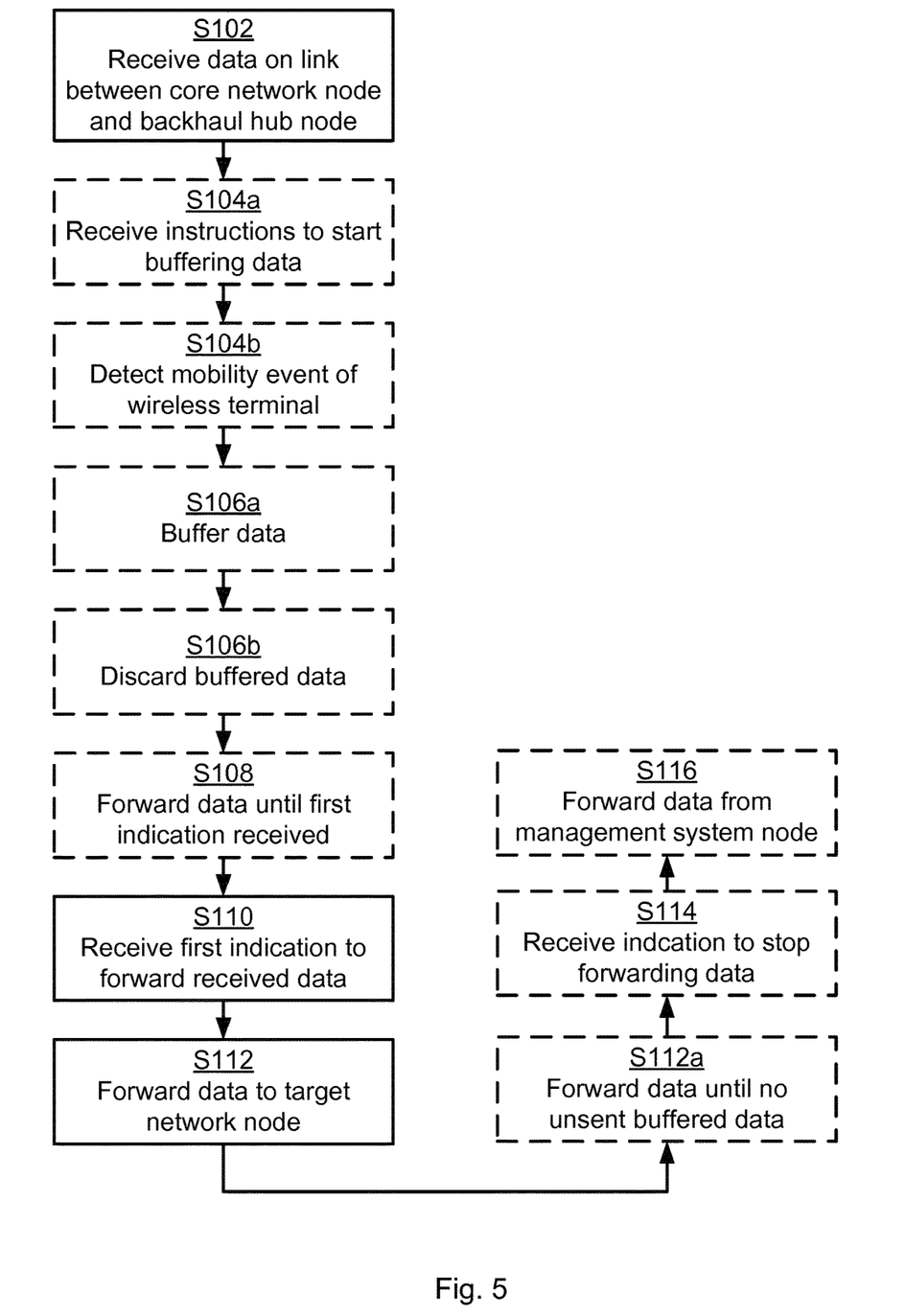

FIGS. 4 and 5 are flow chart illustrating embodiments of methods for forwarding data to a wireless terminal 11. The methods are performed by the proxy node 20. The methods are advantageously provided as computer programs 32.

Reference is now made to FIG. 4 illustrating a method for forwarding data to a wireless terminal 11 according to an embodiment.

The proxy node 20 is operatively provided between the core network 14 and a network node 13. As noted above, the network node 13 may be a macro radio base station and may be associated with a backhaul hub node 16.

The proxy node 20 is configured to, in a step S102, receive data on a link between a core network 14 and a backhaul hub node 16. The data is addressed to a wireless terminal 11 served by, or handed over from, a serving network node 12a. As noted above, the serving network node 12a may be a micro or pico radio base station and may be associated with a client node 17.

The proxy node 20 is configured to, in a step S110, receive a first indication to forward the data to a target network node 12b of the wireless terminal 11. Examples of the first indication will be provided below.

The proxy node 20 is configured to, in a step S112, forward the data towards the target network node 12b in response thereto. For example, as will be further disclosed below, the proxy node 20 may thereby transmit data belonging to a certain wireless terminal 11 (or radio bearer) directly to the target network node 12b after the proxy node 20 has received signaling, from, for example, the serving network node 12a on which radio bearers to forward the data.

For above disclosed item (2), the herein disclosed embodiments will reduce the delay. For new data destined for the serving network node 12a, the data will, according to state of the art, be communicated from the hub node 16 to the serving network node 12a, back to the hub node 16, and then to the wireless terminal 11 via the target network node 12b. However, when the wireless terminal 11 has already connected to the target network node 12b, the data may be received from the S-GW 25 as fast as possible. As the data, according to state of the art, at first takes the unnecessary path through the serving network node 12a, at least ~10 ms (possibly around 20 ms or more if there are any HARQ-failures) will be added because of that path. If the data instead is communicated to the proxy node 20 and then to the target network node 12b 12, as in above disclosed steps S102, S110, S112, the unnecessary path is avoided and the delay will be reduced. Effectively, this makes the time from S-GW 25 to the wireless terminal 11 shorter during the time before the path switch.

For above disclosed item (3), the herein disclosed embodiments will improve the resource usage. Although this kind of data transportation may be regarded as small compared to the expected access data of the wireless terminal 1, the amount of data may, at the moments when it is transported, be large, thus occupying resources in the backhaul network 10c. The amount of data may be in the order of megabits. If the backhaul network 10c is occupied by data from other wireless terminals 11, this will have an impact on the other wireless terminals 11 as the resources have to be shared, possibly implying delays.

Embodiments relating to further details of forwarding data to a wireless terminal 11 will now be disclosed.

There may be different kinds of first indications and different examples of network nodes from which the first indication may be received.

For example, the serving network node 12a may inform the proxy node 20 that data of the wireless terminal 11 should be forwarded to the target network node 12b. The serving network node 12a may only signal which data should be forwarded. That is, the first indication may indicate which data that shall be forwarded to the target network node 12b. Further, the first indication may be received from either the serving network node 12a or the target network node 12b.

Reference is now made to FIG. 5 illustrating methods for forwarding data to a wireless terminal 11 according to further embodiments.

The proxy node 20 may forward data to the serving network node 12a until the first indication is received, since until then the data is to be delivered to the wireless terminal 11 from the serving network node 12a. Therefore, the proxy node 20 may be configured to, in an optional step S108, forward the data towards the serving network node 12a until the first indication is received.

The network node 20 may buffer the data received in step S102. Particularly, the proxy node 20 may be configured to, in an optional step S106a, buffer the data. The thus buffered data may then be forwarded towards the target network node 12b as in step S112 above.

Above disclosed item (1) may be avoided by buffering the data at the proxy node 20. Instead of having to transport all the buffered data, only a message indicating what data shall be forwarded need to be sent to the proxy node 20. When that message has been arrived at the proxy node 20, the data may immediately be forwarded to the target network node 12b as in step S112. This delay reduction may, at least in some scenarios, only have an advantage if the handover time of the wireless terminal 11 is smaller than the time to forward the data.

There may be different ways to indicate when the proxy node 20 shall buffer data as in step S106a. For example the buffering may be time triggered or event triggered. Embodiments relating thereto will now be disclosed in more detail.

Time triggered buffering may not require any explicit co-operation between the proxy node 20 and the serving network node 12a; the proxy node 20 may buffer data for a certain time and then discard it if no signalling that it should be forwarded has been received. Hence, the proxy node 20 may be configured to buffer the data during a time interval starting from when the data was received by the proxy node 20. The proxy node 20 may then be configured to, in an optional step S106b, discard the buffered data after expiration of the time interval. There may be different ways of determine the length of the time interval; the time interval may have a fixed, specified length, or have a random-valued length. The proxy node 20 may thus buffer all incoming data for a certain time interval, $\delta$, and drop the buffered data if no signaling regarding data forwarding has been received within that time interval.

Further, the data may be buffered at least until a second indication is received. This second indication may be identical to, or different from, the first indication.

Event triggered buffering may require at least implicit co-operation between the proxy node 20 and the serving network node 12a; the proxy node 20 may start buffering data after signalling has been received, and keep buffering data until end-marker is received. The forwarding of the buffered data could thus be initiated by the serving network node 12a sending an end-marker to the proxy node 20 once the buffer of the serving network node 12a has been emptied. That is, the proxy node 20 may buffer all incoming data belonging to a certain wireless terminal 11 and its bearers once signaling has been received from either the serving network node 12a or the target network node 12b. Particularly, the proxy node 20 may then be configured to, in an optional step S104a, receive instructions from the serving network node 12a to start buffering the data. The instructions may be received prior to the proxy node 20 receiving the first indication and/or the second indication. The proxy node 20 may then buffer the data as in step S106a in response thereto.

The proxy node 20 may implement a packet forward detector, indicator, and/or sniffer in order to determine whether to buffer data of a wireless terminal 11 or not. This detection may be based on mobility events of the wireless terminal 11. Particularly, the proxy node 20 may be configured to, in an optional step S104b, detect a mobility event of the wireless terminal 11 and buffer the data in response to having detected the mobility event.

The buffering may thus starts once the proxy node 20 detects, for example, a Handover Request or a Handover Request Acknowledge, by, for example, sniffing the X2-signaling, or receiving explicit signaling from either the serving network node 12a or the target network node 12b. That is, the detected mobility event may pertain to a handover request of the wireless terminal 11. There may be different ways for the proxy node 20 to detect the mobility event. For example, the mobility event may be indicated by a sequence number (SN) status transfer message received by the proxy node 20. Reception of a SN status message and signaling indicating start of data forwarding may trigger the proxy node 20 to forward buffered data. The SN status message may be an X2AP (X2 Application Protocol) message.

There may be different ways to determine how long the proxy node 20 is to forward buffered data towards the target network node 12b.

For example, the proxy node 20 may forward buffered data to the target network node 12b until the buffer is empty. Hence, the proxy node 20 may be configured to, in an optional step S112a, forward the data towards the target network node 12b until the proxy node 20 has no unsent buffered data addressed to the wireless terminal 11 left.

For example, the proxy node 20 may forward buffered data to the target network node 12b until an indication is received. Hence, the proxy node 20 may be configured to, in an optional step S114, receive a further indication from the serving network node 12a to stop forwarding data to the target network node 12b. The proxy node 20 may then forward data towards the target network node 12b until the further indication is received.

There may be different types of signalling used for the proxy node 20 to receive and forward data. For example, the data may by the proxy node 20 be received and forwarded using PDCP signalling. The data forwarding signaling to the proxy node 20 could be based on PDCP by the proxy node 20 continuously keeping track of PDCP state.

In existing data forwarding mechanisms, the target base station 12b provides tunnel endpoint information per stream to be forwarded from the serving network node 12a to the target network node 12b. In order to comply with such existing mechanisms, the serving network node 12a may, according to embodiments disclosed herein, signal the data forwarding tunnel information to the proxy node 20. The proxy node 20 may then associate this tunnel information with the buffered data packets when forwarding the packets to the target network node 12b. Particularly, the wireless terminal 11 may be identified by at least one of a Tunnel endpoint identifier (TEID), an Internet Protocol (IP) address, a User Datagram Protocol (UDP) port, a Transmission Control Protocol (TCP) port, a Stream Control Transmission Protocol (SCTP) port, a host identifier, or a radio bearer.

In general terms, the GTP Tunnel Endpoint IE identifies an X2 transport bearer or the S-GW 25 endpoint of the S1 transport bearer associated to an E-RAB. It contains a Transport Layer Address and a GTP Tunnel Endpoint Identifier. The Transport Layer Address is an IP address to be used for the X2 user plane transport. The GTP Tunnel Endpoint Identifier is to be used for the user plane transport between network nodes and the S-GW 25 or between network nodes.

There may be different types of data to be forwarded to the wireless terminal 11. For example, the data forwarded to the wireless terminal 11 may be user data, control data, etc. Particularly, the proxy node 20 may be configured to, in an optional step S116, forward data to the wireless terminal 11 from a management system node. The forwarding may be based on a buffering procedure configuration, a data forwarding triggering condition configuration, and/or a configuration of wireless terminal identification interpretation.

Three particular embodiments based on at least some of the above disclosed embodiments and relating to a successful X2-based handover (inter E-UTRAN handover) without change of core entities such as MME 24 or S-GW 25 will now be disclosed. However, as is clear from above, the herein disclosed embodiments could be equally applied to other combinations of handover as well. Further, the particular embodiments are provided as illustrative, non-limiting, examples and some of the below presented steps may be skipped, or performed partially, or performed in a different order. The proxy node 20 is a node associated with the serving network node 12a.

Figure 7:
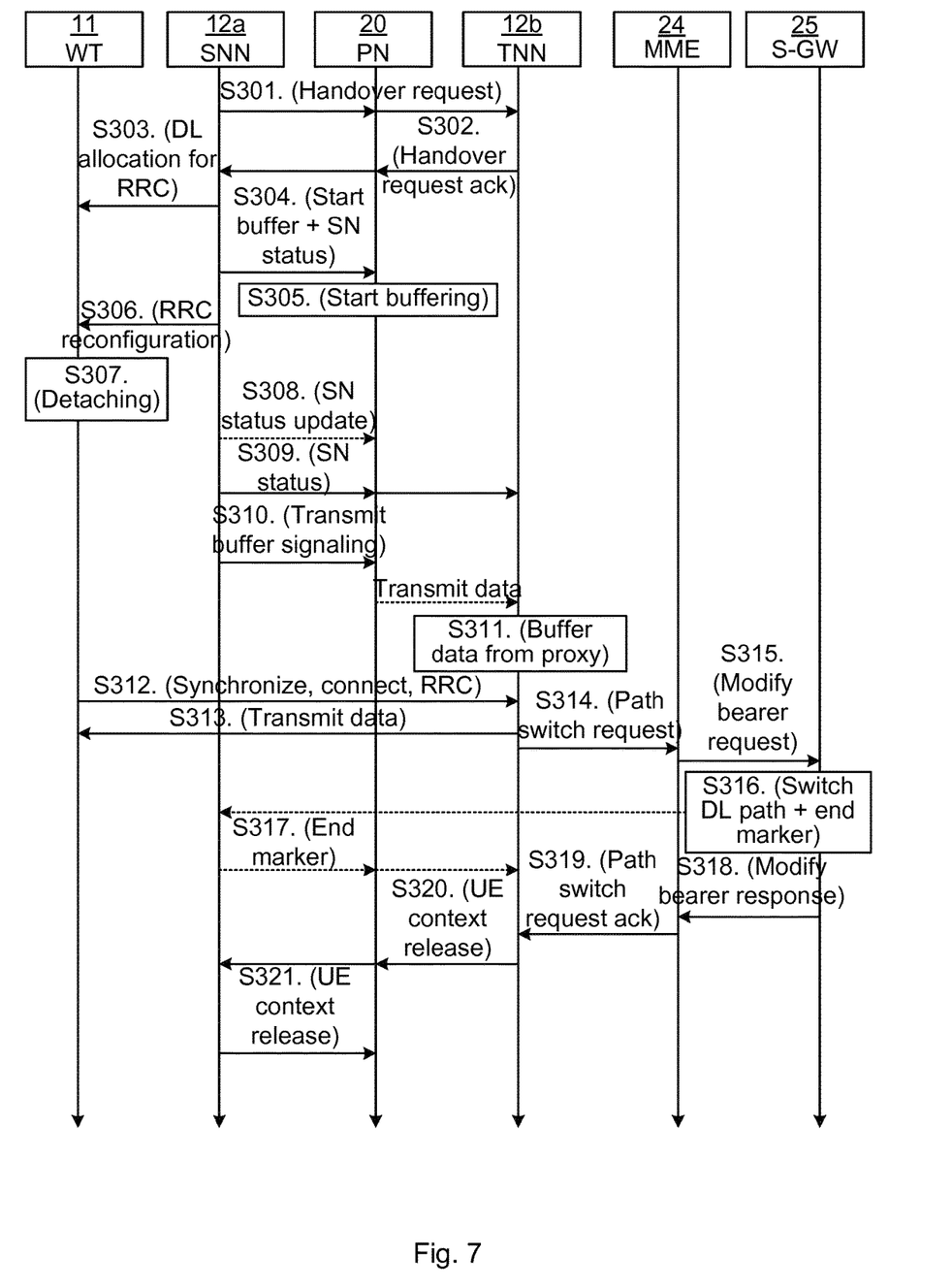
FIGS. 7, 8, and 9 are signalling diagrams according to embodiments.

A particular embodiment based on at least some of the above disclosed embodiments and relating to scenarios where the serving network node 12a has made a decision to hand over the wireless terminal 11 to the target network node 12b will now be disclosed with reference to the signalling diagram of FIG. 7.

S301: The serving network node 12a sends a Handover Request to the target network node 12b.

S302: The target network node 12b performs an admission control and transmits a Handover Request Acknowledge to the serving network node 12a.

S303: The serving network node 12a allocates downlink (DL) resources for the wireless terminal 11 for RRC reconfiguration.

S304: The serving network node 12a signals the proxy node 20 to start buffer data belonging to the wireless terminal 11 and the wireless terminal's 11 radio bearers which are to be handed over to the target network node 12b. It also transmits SN status and enough information for the proxy node 20 to be able to perform data forwarding according to the X2 interface.

S305: The proxy node 20 buffers data belonging to the wireless terminal 11 and the wireless terminal's 11 radio bearers which are to be handed over to the target network node 12b (SN according to the SN status received).

S306: The serving network node 12a transmits RRC connection reconfiguration including mobility Control information to the wireless terminal 11.

S307: The wireless terminal 11 detaches from the serving network node 12a.

S308: If the serving network node 12a has transmitted more data to the wireless terminal 11 compared to what the proxy node 20 was informed, the serving network node 12a transmits the updated SN status.

S309: The serving network node 12a transmits a SN Status Transfer to the target network node 12b.

S310: The serving network node 12a signals the proxy node 20 to empty its buffer/start transmitting to the target network node 12b.

S311: The target network node 12b buffers packets from the serving network node 12a and/or proxy node 20.

S312: The wireless terminal 11 synchronizes and connects to the target network node 12b and performs necessary RRC reconfiguration.

S313: Packet data can now be received/transmitted between the wireless terminal 11 and the target network node 12b.

S314: The target network node 12b transmits a Path Switch Request to the serving MME 24.

S315: The serving MME 24 transmits a Modify bearer Request to the S-GW 25.

S316: The DL path is switched to the target network node 12b and an end marker is sent to the serving network node 12a.

S317: The serving network node 12a transmits the end marker to the target network node 12b.

S318: The S-GW 25 transmits a Modify Bearer Response to the serving MME 24.

S319: The serving MME 24 transmits a Path Switch Request Acknowledge to the target network node 12b.

S320: The target network node 12b transmits a wireless terminal (UE) Context Release to the serving network node 12a.

S321: The serving network node 12a informs the proxy node 20 to release the resources once the buffer has been emptied.

Figure 8:
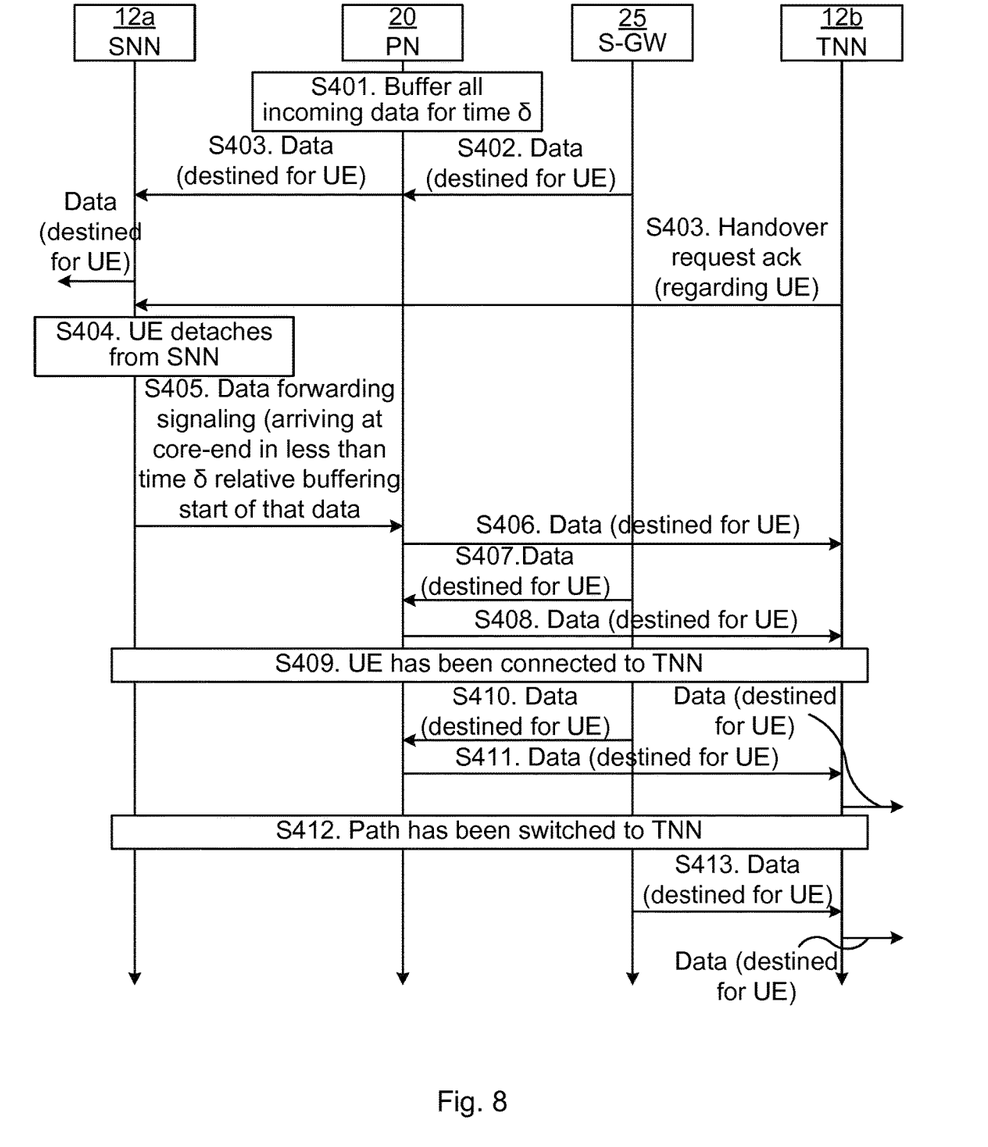

A particular embodiment based on at least some of the above disclosed embodiments and relating to scenarios where the data forwarding signaling does not contain any end-user data but rather information on which data to be forwarded as well as information needed to be able to forward it correctly will now be disclosed with reference to the signalling diagram of FIG. 8. The signalling diagram does not illustrate details regarding the wireless terminal context release.

S401: The proxy node 20 starts buffering all incoming data for a duration in time δ.

S402: The S-GW 25 transmits data destined for the wireless terminal 11 through the proxy node 20.

S403: The proxy node 20 transmits the data from the S-GW 25 destined for the wireless terminal 11 to the serving network node 12a.

S404: The serving network node 12a transmits the data to the wireless terminal 11.

S405: The serving network node 12a receives a handover request Acknowledge from the target network node 12b.

S406: The wireless terminal 11 detaches from the serving network node 12a.

S407: The serving network node 12a 12 signals the proxy node 20 to forward data related to the wireless terminal 11.

S408: The proxy node 20 transmits the data belonging to the wireless terminal 11 from the buffer to the target network node 12b.

S409: New data for the wireless terminal 11 is transmitted from the S-GW 25 to the proxy node 20 (actually destined for the serving network node 12a).

S410: The proxy node 20 transmits the data directly to the target network node 12b (rather than to the serving network node 12a) possibly via the core network.

S411: The wireless terminal 11 is operatively connected to the target network node 12b.

S412: New data for the wireless terminal 11 is transmitted from the S-GW 25 to the proxy node 20 (actually destined for the serving network node 12a).

S413: The proxy node 20 transmits the data directly to the target network node 12b (rather than to the serving network node 12a) possibly via the core network.

S414: The target network node 12b transmits the data to the wireless terminal 11.

S415: The data path is switched to the target network node 12b.

S416: New data from S-GW 25 destined for the wireless terminal 11 is transmitted to the target network node 12b.

S417: The network node 12b transmits the data to the wireless terminal 11.

Figure 9:
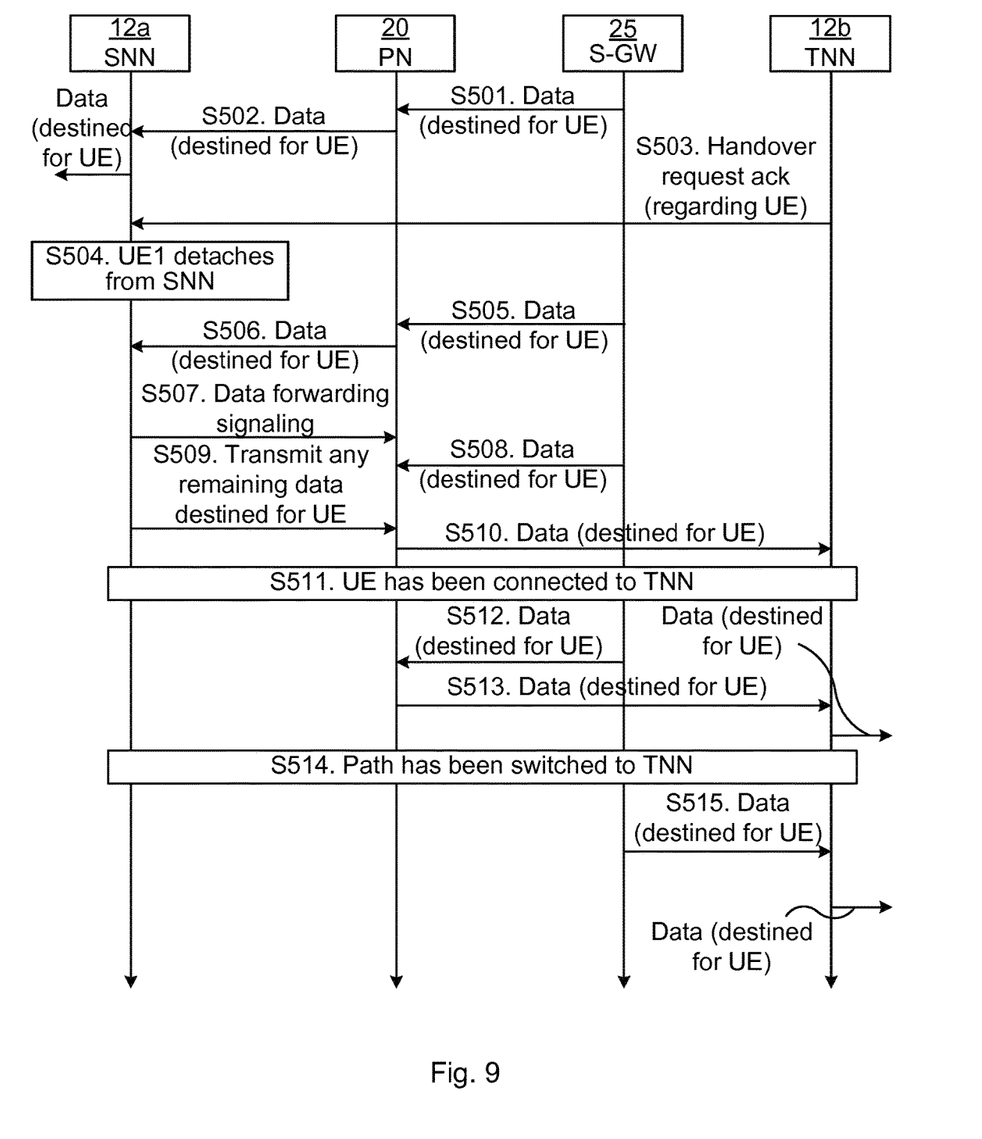

A particular embodiment based on at least some of the above disclosed embodiments and relating to scenarios where the data forwarding signaling does not contain any end-user data but rather information on which data to be forwarded as well as information needed to be able to forward it correctly will now be disclosed with reference to the signalling diagram of FIG. 9. In this particular embodiment, some data might have arrived at the serving network node 12a before the proxy node 20 has been setup to forward data. The signalling diagram does not illustrate details regarding the wireless terminal (UE) context release.

S501: The S-GW 25 transmits data destined for the wireless terminal 11 through the proxy node 20.

S502: The proxy node 20 transmits the data from the S-GW 25 destined for the wireless terminal 11 to the serving network node 12a.

S503: The serving network node 12a transmits the data to the wireless terminal 11.

S504: The serving network node 12a receives a handover request Acknowledge from the target network node 12b.

S505: The wireless terminal 11 detaches from the serving network node 12a.

S506: The S-GW 25 transmits data destined for the wireless terminal 11 through the proxy node 20.

S507: The proxy node 20 transmits the data from the S-GW 25 destined for the wireless terminal 11 to the serving network node 12a.

S508: The serving network node 12a signals the proxy node 20 to start data forwarding.

S509: The S-GW 25 transmits data destined for the wireless terminal 11 through the proxy node 20.

S510: The serving network node 12a transmits any remaining data destined for the wireless terminal 11 to the target network node 12b through the proxy node 20.

S511: The proxy node 20 transmits data destined for the wireless terminal 11 to the target network node 12b.

S512: The wireless terminal 11 is operatively connected to the target network node 12b.

S513: The S-GW 25 transmits data destined for wireless terminal 11 through the proxy node 20.

S514: The proxy node 20 transmits the data destined for the wireless terminal 11 to the target network node 12b.

S515: The target network node 12b transmits the data to the wireless terminal 11.

S516: The data path is switched from the S-GW 25 to the target network node 12b.

S517: New data from S-GW 25 destined for the wireless terminal 11 is transmitted to the target network node 12b.

S518: The target network node 12b transmits the data to the wireless terminal 11.

In summary, at least some of the herein disclosed embodiments enable a significant portion of the transmission over the wireless backhaul network 10c belonging to the wireless terminal 11 being handed over to be avoided during handover, especially when data of the wireless terminal 11 is buffered by the proxy node 20. In order to achieve this, it may be enough for the serving network node 12a to inform the proxy node 20 (either directly or indirectly) that the data belonging to a certain wireless terminal 11 (TEID/IP-address/UDP-port, etc.) should be forwarded to the target network node 12b. The corresponding data may then be transmitted directly to the target network node 12b according to the X2 interface.

The transmission over the wireless backhaul link 18 is thus reduced from having to send all the data of the wireless terminal 11 through the wireless backhaul network 10c, to only signaling which data should be forwarded, which reduces both delay and usage of resources.

As disclosed above, the proxy node 20 may start buffering data belonging to certain wireless terminals 11 after signaling has been received (such as after Handover Request Acknowledge and the UE detach). As also disclosed above, another possibility is for the proxy node 20 to buffer all data for a certain time and then discarded it if, for example, the serving network node 12a, has not signaled that it should be forwarded. When the serving network node 12a receives the UE Context Release, it may informs the core network 14 to release the UE context, and thus the proxy node 20 to stop buffering data and empty its buffer.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for forwarding data to a wireless terminal, the method comprising a proxy node:
   receiving data on a link between a core network and a backhaul hub node, the data being addressed to a wireless terminal served by, or handed over from, a serving network node;
   receiving a first indication to forward the data to a target network node of the wireless terminal;
   forwarding the data towards the target network node in response to receiving the first indication; and
   receiving a further indication from the serving network node to stop forwarding data to the target network node;
   wherein the proxy node comprises a standalone device or a device integrated with a network node in the core network or with the backhaul hub node; and
   wherein the data is forwarded towards the target network node until the further indication is received.

2. The method of claim 1, further comprising buffering the data.

3. The method of claim 2:
   wherein the data is buffered during a time interval starting from when the data was received by the proxy node;
   wherein the method further comprises discarding the buffered data after expiration of the time interval.

4. The method of claim 2, wherein the data is buffered at least until a second indication is received.

5. The method of claim 4, wherein the second indication is identical to the first indication.

6. The method of claim 4:
   further comprising receiving instructions from the serving network node to start buffering the data;
   wherein the instructions are received prior to receiving at least one of the first indication and the second indication;
   wherein the data is buffered in response to receiving the instructions.

7. The method of claim 2:
   further comprising detecting a mobility event of the wireless terminal; and
   wherein the data is buffered in response to the detecting.

8. The method of claim 7, wherein the mobility event pertains to a handover request of the wireless terminal.

9. The method of claim 7, wherein the mobility event is indicated by a sequence number status transfer message.

10. The method of claim 2, further comprising forwarding the data towards the target network node until the proxy node has no unsent buffered data addressed to the wireless terminal left.

11. The method of claim 1, further comprising forwarding the data towards the serving network node until the first indication is received.

12. The method of claim 1, wherein the first indication indicates which data that shall be forwarded to the target network node.

13. The method of claim 1, wherein the wireless terminal is identified by at least one of: a Tunnel endpoint identifier, an Internet Protocol address, a User Datagram Protocol port, a Transmission Control Protocol port, a Stream Control Transmission Protocol port, a host identifier, or a radio bearer.

14. The method of claim 1, wherein the data is received and forwarded using Packet Data Convergence Protocol signaling.

15. The method of claim 1, wherein the first indication is received from the serving network node or the target network node.

16. The method of claim 1, further comprising forwarding data to the wireless terminal from a management system node.

17. The method in claim 16, wherein the forwarding is based on at least one of: a buffering procedure configuration, a data forwarding triggering condition configuration, and a configuration of wireless terminal identification interpretation.

18. A proxy node for forwarding data to a wireless terminal, the proxy node comprising:
   processing circuitry;
   memory containing instructions executable by the processing circuitry whereby the proxy node is operative to:
   receive data on a link between a core network and a backhaul hub node, the data being addressed to a wireless terminal served by, or handed over from, a serving network node;
   receive a first indication to forward the data to a target network node of the wireless terminal;
   forward the data towards the target network node in response thereto; and
   receive a further indication from the serving network node to stop forwarding data to the target network node;
   wherein the proxy node comprises a standalone device or a device integrated with a network node in the core network or with the backhaul hub node; and
   wherein the data is forwarded towards the target network node until the further indication is received.

19. The proxy node of claim 18, wherein the proxy node is co-located with the backhaul hub node.

20. The proxy node of claim 18, wherein the proxy node is co-located with a network node in the core network.

21. A non-transitory computer readable recording medium storing a computer program product for forwarding data to a wireless terminal, the computer program product comprising software instructions which, when run on processing circuitry of a proxy node, causes the proxy node to:
   receive data on a link between a core network and a backhaul hub node, the data being addressed to a wireless terminal served by, or handed over from, a serving network node;
receive a first indication to forward the data to a target network node of the wireless terminal;
forward the data towards the target network node in response thereto; and
   receive a further indication from the serving network node to stop forwarding data to the target network node;

wherein the proxy node comprises a standalone device or a device integrated with a network node in the core network or with a backhaul hub node; and wherein the data is forwarded towards the target network node until the further indication is received.

* * * * *